(12) United States Patent
Bidaud et al.

(10) Patent No.: US 7,650,679 B2
(45) Date of Patent: Jan. 26, 2010

(54) METHOD OF HANDLING A WORKPIECE IN A WORKSTATION

(75) Inventors: Daniel Bidaud, Taverny (FR); Gérard Pinchon, Acheres (FR); Bernard Negre, Paris (FR)

(73) Assignee: ABB France, Rueil Malmaison (FR)

( * ) Notice: Subject to any disclaimer, the term of this patent is extended or adjusted under 35 U.S.C. 154(b) by 297 days.

(21) Appl. No.: 11/660,326

(22) PCT Filed: Aug. 11, 2005

(86) PCT No.: PCT/FR2005/002072

§ 371 (c)(1),
(2), (4) Date: Feb. 15, 2007

(87) PCT Pub. No.: WO2006/021678

PCT Pub. Date: Mar. 2, 2006

(65) Prior Publication Data

US 2007/0245537 A1   Oct. 25, 2007

(30) Foreign Application Priority Data

Aug. 16, 2004   (FR) .................................. 04 08905

(51) Int. Cl.
*B23P 11/00*   (2006.01)
*B23P 21/00*   (2006.01)

(52) U.S. Cl. ............................. 29/464; 29/559; 29/787; 29/795; 901/41; 901/42

(58) Field of Classification Search ................... 29/464, 29/466, 467, 468, 559, 783, 787, 795; 901/31, 901/41, 42
See application file for complete search history.

(56) References Cited

U.S. PATENT DOCUMENTS

| 6,339,874 B2 * | 1/2002 | Segawa et al. ................ 29/824 |
| 6,360,421 B1 | 3/2002 | Oatridge et al. |
| 6,389,698 B1 * | 5/2002 | Malatier .................... 29/897.2 |

FOREIGN PATENT DOCUMENTS

| DE | 198 35 589 | 2/2000 |
| DE | 203 04 022 | 7/2004 |
| EP | 1 380 392 | 1/2004 |
| JP | 60113782 A * | 6/1985 |
| JP | 62 275597 | 11/1987 |
| JP | 07 303996 | 11/1995 |
| JP | 09 192947 | 7/1997 |
| WO | WO 03/080288 | 10/2003 |

* cited by examiner

*Primary Examiner*—Jermie E Cozart
(74) *Attorney, Agent, or Firm*—Young & Thompson

(57) ABSTRACT

The invention concerns a method for handling at least one part in a station for fixing two parts one on the other, characterized in that it comprises the following steps: positioning the parts in a station using a support (4); starting the fixing operation; replacing the support with a gripping robot (6) when the fixing operation has progressed sufficiently to lock the relative positioning of the two parts; mounting new parts in the support when the replacement has been made; and after the parts have been fixed, removing the thus fixed parts from the station using the gripping robot.

6 Claims, 1 Drawing Sheet

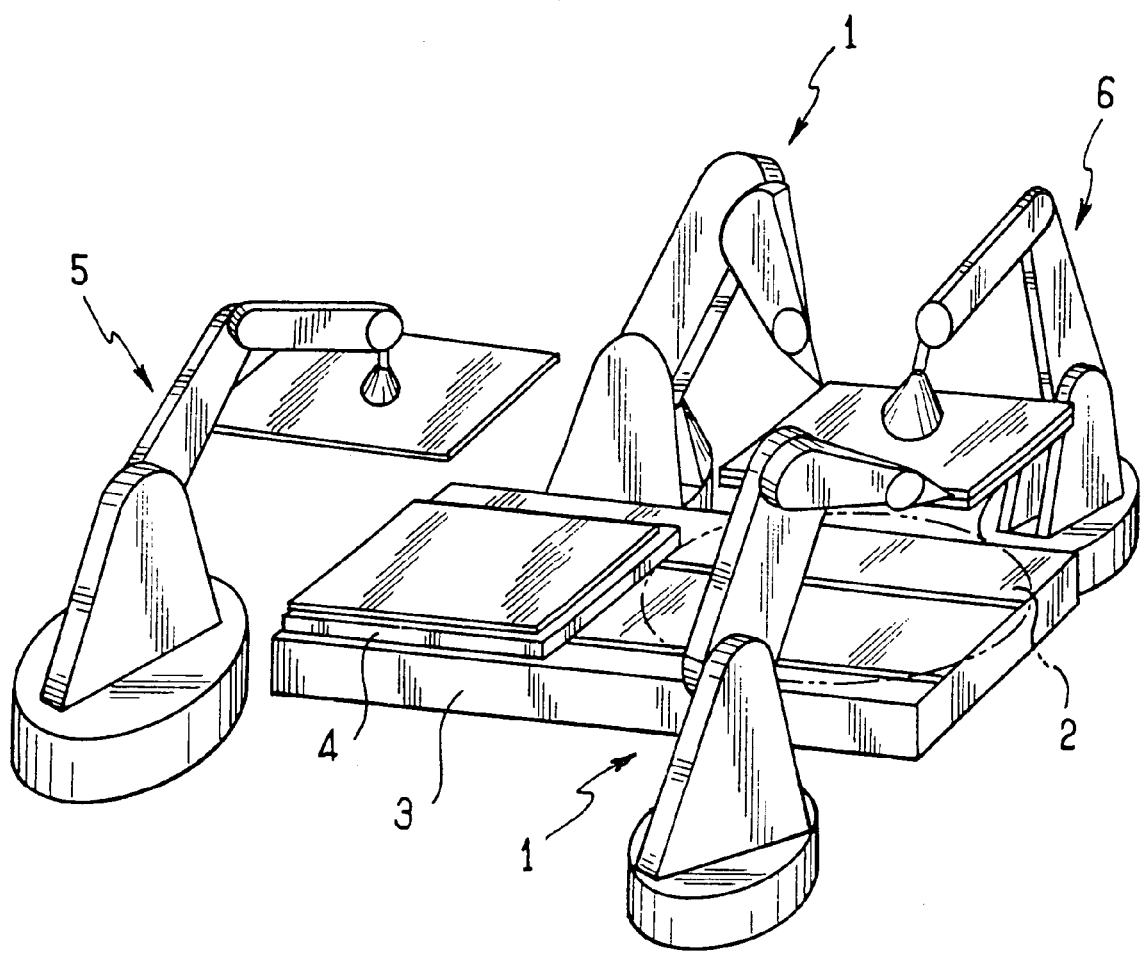

METHOD OF HANDLING A WORKPIECE IN A WORKSTATION

BACKGROUND OF THE INVENTION

1. Field of the Invention

The invention relates to a method of handling workpieces in a workstation for fastening together at least two workpieces by an operation such as welding, crimping, riveting, etc.

2. Description of the Related Art

Workstations are known that comprise a support for positioning a workpiece in the workstation while work is being carried out, and a handling robot for removing the workpiece from the workstation once the work has been done. The support is mounted on a slide that enables the support to be extracted from the workstation so as to enable a workpiece to be loaded thereon while a support provided with a workpiece is being introduced into the workstation to enable work to be performed thereon. The loading of a workpiece on the support thus takes place while work is taking place. Nevertheless, that makes it necessary to have at least two supports and a slider system. In addition, the handling robot is not used throughout the duration of a cycle.

BRIEF SUMMARY OF THE INVENTION

It would therefore be advantageous to have means enabling the elements needed for loading and unloading a workpiece in such a workstation to be simplified.

To this end, the invention provides a method of handling at least one workpiece in a workstation for fastening at least two workpieces together, the method comprising the steps of:

- positioning the workpieces in the workstation by means of a support;
- beginning fastening;
- using a handling robot to take over the support function once the fastening has advanced sufficiently to set the relative positioning of the two workpieces;
- mounting new workpieces on the support as soon as the handling robot has taken over; and
- at the end of fastening together, using the handling robot to remove the workpieces fastened together in this way from the workstation.

Thus, the handling robot is used to a greater extent during the work cycle since it also contributes to positioning the workpiece. Furthermore, the new workpiece can be loaded in the support while work is taking place. In addition, once the workpiece has been taken hold of by the handling robot in order to be positioned, the robot is ready to remove said workpiece once the work has terminated. This saves time in the operation for removing the workpiece.

Preferably, prior to mounting new workpieces on the support, the support is removed from the workstation.

This makes it possible to have a large area available for loading the workpiece on the support without any risk of impeding the movements of the robots that are carrying out the work. Once the new workpiece is on the support, the support can be inserted in the workstation while the preceding workpiece is still being worked on.

Other characteristics and advantages of the invention appear on reading the following description of a particular and non-limiting embodiment of the invention.

BRIEF DESCRIPTION OF THE DRAWINGS

Reference is made to the sole accompanying FIGURE which is a diagram showing a workstation that can be used for implementing the method of the invention.

DETAILED DESCRIPTION OF THE INVENTION

The workstation described herein is a welding station comprising two robots given overall references 1, that are themselves conventional, each having an arm with an end provided with a welding clamp. The welding robots 1 are disposed around a working zone 2 (symbolized by a chain-dotted line).

The workstation includes a loader device 3 for loading workpieces in the work zone 2. The loader device 3 comprises firstly a conventional slider system that enables a support for workpieces for welding together to be introduced into the work zone 2, and secondly a loading robot 5 that places the workpieces on the support 4. The support 4 is movable between a loading position in which the support 4 lies outside the working zone and a working position in which the support 4 is in the working zone. The support 4 also includes in conventional manner members for positioning the workpieces for welding together and for preventing them from moving relative to each other (these members are not shown in the FIGURE).

The workstation also includes a device for unloading the workpiece from the working zone 2, which device comprises a handling robot 6 of conventional kind.

In accordance with the invention, the method of handling begins with a step of loading workpieces on the support 4 while it is in its loading position. The support 4 is then brought into its working position in which it positions the workpieces.

It is then possible to begin welding the workpieces together.

In parallel, the handling robot takes hold of at least one of the workpieces, and once welding has advanced to the point where the relative positioning between the workpieces has become set, the handling robot 6 separates the workpieces from the support 4 and takes over its supporting role. In order to ensure that welding is not interrupted while the takeover is taking place, the welding robots are programmed to take account of the change in the positioning of the workpieces so as to track the displacement of the workpieces.

The support 4 is then returned to its loading position so that the loading robot 5 can place the following workpieces on the support 4, which is subsequently returned to the working position.

Once welding has been completed, the handling robot 6 removes the workpieces from the working zone, while the welding robots 1 begin to weld together the workpieces that are resting on the support 4.

Thus, the means for positioning the workpieces while work is taking place in the workstation comprise the support 4 for positioning the workpieces during an initial portion of the work, and the handling robot 6 for positioning the workpieces during a second portion of the work.

Naturally, the invention is not restricted to the embodiment described and variants can be applied thereto without going beyond the ambit of the invention as defined by the claims.

In particular, the support 4 can be left in the working zone for loading purposes.

Furthermore, other fastening methods could be envisaged, in particular such as crimping, riveting, stapling, . . . .

The invention claimed is:

1. A method of handling at least one workpiece in a workstation for fastening together at least two workpieces, the method comprising the steps of:
   positioning the workpieces in the workstation by means of a support (4);
   beginning fastening;

using a handling robot (6) to support the two workpieces once the fastening of said two workpieces has advanced sufficiently to provide a relative positioning of the two workpieces;

mounting new workpieces on the support as soon as the handling robot has taken over supporting the two workpieces; and fastening the workpieces thus supported by the handling robot and at the end of fastening together, using the handling robot to remove from the workstation the workpieces thus fastened together.

2. The method according to claim 1, wherein, prior to mounting new workpieces on the support (4), the support is moved out from the workstation.

3. The method according to claim 1, wherein the support (4) is on a loader device (3) for loading the workpieces into a work zone (2).

4. The method according to claim 3, wherein the loader device (3) is a slider.

5. The method according to claim 3, wherein the support (4) is movable between a loading position in which the support (4) lies outside the work zone (2) and a working position in which the support (4) is within the work zone (2).

6. The method according to claim 1, wherein the fastening is welding.

\* \* \* \* \*